United States Patent
Anisimov et al.

(10) Patent No.: US 8,948,373 B2
(45) Date of Patent: *Feb. 3, 2015

(54) SYSTEM AND METHODS FOR OUTBOUND DIALING IN MULTI-CAMPAIGN AND BLENDED ENVIRONMENT OF VIRTUAL CONTACT CENTER

(71) Applicant: Five9, Inc., San Ramon, CA (US)

(72) Inventors: Nikolay Anisimov, Concord, CA (US); Dmitry Spasibenko, Livermore, CA (US); Sam Shkrabov, Casto Valley, CA (US); David Van Everen, San Francisco, CA (US)

(73) Assignee: Five9, Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/185,071

(22) Filed: Feb. 20, 2014

(65) Prior Publication Data

US 2014/0169551 A1 Jun. 19, 2014

Related U.S. Application Data

(63) Continuation of application No. 13/332,510, filed on Dec. 21, 2011, now Pat. No. 8,699,699.

(60) Provisional application No. 61/426,992, filed on Dec. 23, 2010, provisional application No. 61/427,151, filed on Dec. 24, 2010, provisional application No. 61/430,660, filed on Jan. 7, 2011, provisional application No. 61/430,669, filed on Jan. 7, 2011.

(51) Int. Cl.
*H04M 3/00* (2006.01)
*H04M 5/00* (2006.01)
*H04M 3/51* (2006.01)

(52) U.S. Cl.
CPC .................................. *H04M 3/5158* (2013.01)

USPC ............ 379/266.07; 379/265.01; 379/265.02; 379/265.1; 379/265.11; 379/266.08

(58) Field of Classification Search
CPC ... H04M 3/51; H04M 3/5158; H04M 3/5183; H04M 3/523; H04M 2203/40; H04M 2203/402; H04M 2203/407; H04M 2203/408; H04M 2242/18
USPC ............. 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS 5,214,688 A * 5/1993 Szlam et al. ............. 379/266.08
5,247,569 A * 9/1993 Cave ........................ 379/266.08

(Continued)

*Primary Examiner* — Khai N Nguyen
(74) *Attorney, Agent, or Firm* — Jones Day

(57) ABSTRACT

A method for determining a number of calls to generate for a specific outbound campaign in an automated contact center based upon a prediction of agent occupancy in a future time period, wherein the automated contact center processes one or more outbound campaigns. The estimates a total number of outbound agents available to the one or more outbound campaigns. By using the total number of outbound agents, an effective number of agents for the specific outbound campaign is determined according to a ratio. The effective number of agents is used to determine a number of outbound calls to generate for the specific outbound campaign according to a dialing method. Calls are then generated for the specific outbound campaign based upon the determined number of outbound calls to generate.

20 Claims, 8 Drawing Sheets

(56) References Cited

U.S. PATENT DOCUMENTS

| | | | |
|---|---|---|---|
| 5,519,773 A * | 5/1996 | Dumas et al. | 379/265.05 |
| 5,815,566 A * | 9/1998 | Ramot et al. | 379/210.01 |
| 6,044,355 A * | 3/2000 | Crockett et al. | 705/7.39 |
| 6,449,358 B1 * | 9/2002 | Anisimov et al. | 379/266.07 |
| 6,744,878 B1 * | 6/2004 | Komissarchik et al. | 379/265.03 |
| 2002/0041674 A1 * | 4/2002 | Kamen | 379/266.07 |
| 2002/0126828 A1 * | 9/2002 | Kamen | 379/265.01 |
| 2010/0303225 A1 * | 12/2010 | Shashkov et al. | 379/265.11 |

* cited by examiner

SYSTEM AND METHODS FOR OUTBOUND DIALING IN MULTI-CAMPAIGN AND BLENDED ENVIRONMENT OF VIRTUAL CONTACT CENTER

CROSS REFERENCES

The present application is a continuation of U.S. patent application Ser. No. 13/332,510, filed on Dec. 21, 2011, now U.S. Pat. No. 8,699,699, which claims priority to U.S. Provisional Patent Applications: "System and Methods for Optimal Outbound Dialing in Virtual Contact Center," Ser. No. 61/426,992, filed Dec. 23, 2010; "System and Methods for Outbound Dialing in Multi-Campaign and Blended Environment of Virtual Contact Center," Ser. No. 61/427,151, filed Dec. 24, 2010; "Method for Controlling Abandonment Rate in Outbound Campaigns," Ser. No. 61/430,660, filed Jan. 7, 2011; and "Method for Estimation Impact of Calls in Dialer for Predictive Dialing," Ser. No. 61/430,669, filed Jan. 7, 2011. The contents of the foregoing applications are all incorporated herein by reference in their entirety.

FIELD

The technology described in this patent document relates generally to contact centers, and more particularly to dialing methods used by the contact centers for determining a number of outbound calls to generate.

BACKGROUND

One function typically performed by a contact center is conducting outbound campaigns, where agents of the contact center proactively contact prospective customers to make a sale or to achieve some other objective. To optimize agent utilization, a contemporary contact center often utilizes an automated dialing system to handle the dialing aspect of an outbound call. The automated dialing system, in general, is responsible for automatically making outbound calls to potential customers and routing only the successfully connected calls to agents. Thus, with the dialing process being automated by the system, agents can focus their time on interfacing with customers.

SUMMARY

In accordance with the teachings described herein, methods and systems are provided for determining a number of calls to generate for a specific outbound campaign in an automated contact center that processes one or more outbound campaigns. The contact center comprises a dialer for dialing generated calls, a queue where successfully connected dialed calls await agent handling, and an agent pool where calls are handled by agents.

A method for determining a number of calls to generate may include: estimating a total number of outbound agents available to the one or more outbound campaigns; determining an effective number of agents for the specific outbound campaign using the total number of outbound agents and according to a ratio; determining a number of outbound calls to generate for the specific outbound campaign using the effective number of agents according to a dialing method; and generating calls for the specific outbound campaign based upon the determined number of outbound calls to generate.

DETAILED DESCRIPTION

An automated dialing system of a contact center may have multiple responsibilities. In addition to dialing calls and forwarding successful calls to agents, the automated dialing system may also have the responsibility of determining an optimal number of calls to generate. The number of calls is important because generating too few calls may result in underutilization of the agents, and generating too many calls may result in a backlog of calls that could cause customer dissatisfaction. In order to generate enough calls to adequately occupy the agents while not unreasonably adding to the backlog, it is desirable for the automated dialing system to take into consideration relevant system conditions, such as agent occupancy, when determining a number of calls to generate. More particularly, since a generated call typically would not reach an agent until a future time, it is desirable when determining the number of calls to generate to predict and consider relevant contact center conditions at the future time.

Figure 1:
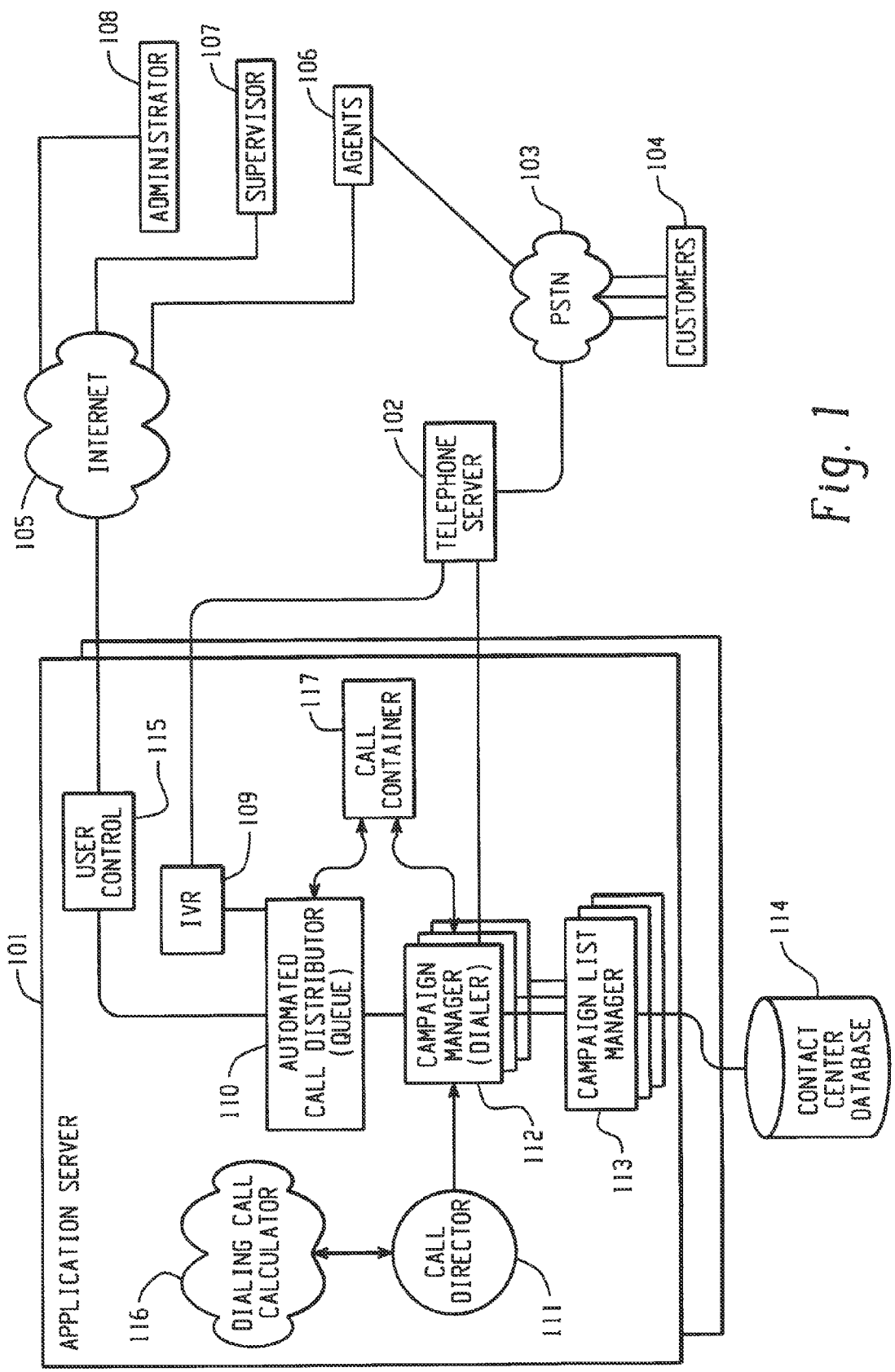
FIG. 1 is a block diagram of an example system for a call contact center.

FIG. 1 is a block diagram of an example of an automated dialing system implemented by a virtual contact center. At a high level, the system includes an application server 101 that facilitates communication connections between customers 104 and agents 106 (agents 106 may include supervisors 107, administrators 108, and other human or non-human resources that interface with the customers 104). The system may have more than one instance of the application server 101, with each instance servicing, for example, a different tenant. However, for simplicity the ensuing description will focus on one instance of the application server 101.

To establish communication connections with customers 104, the application server 101 connects to a telephone server 102. The telephone server 102, which is responsible for third party call control, communicates with customers 104 through a network, such as a Public Switched Telephone Network (PSTN) 103. Although the particular example of FIG. 1 depicts using telephonic means to communicate with customers 104, other communication means may also be employed, such as Internet chat systems or cellular phone messaging systems.

The application server 101 is also communicatively connected with agents 106. FIG. 1. depicts the communication being established through the Internet 105, but any other communication means may be used as well (e.g., through a private or local network).

Connected in this manner, the application server 101 in operation can use the telephone server 102 to generate outbound calls over the PSTN 103 and establish telephonic connections with the customers 104. Once a connection is established, the application server 101 routes the connected call to an available agent 106 through the Internet 105. At a high level, the operation of generating outbound calls, establishing connection with customers 104, and routing successful connections to agents 106 is one of the basic functions of the automated dialing system.

At a more detailed level, when generating outbound calls, the application server 101 employs a campaign manager 112. The campaign manager 112 periodically generates, controls, and monitors all outbound calls during their lifecycles. The generated outbound calls may, for example, be represented as software objects and stored in a call container 117, which is accessible to the campaign manager 112 and an automated call distributor 110 (described below).

Before calls are generated, however, the campaign manager 112 determines an optimal number of calls to generate. As described above, the number of calls to generate is important for achieving and maintaining desirable system conditions (e.g., having an agent occupancy of 90%). To determine the number of calls to generate, the campaign manager 112 invokes a call director 111, which uses a dialing call calculator 116 to calculate the number of calls to generate. The dialing call calculator 116 is an implementation of one or more methods for calculating the number of calls to generate. Examples of the methods will be described in more detail below with respect to FIGS. 3-10. Once the dialing call calculator 116 determines the number of calls to generate and communicates that number to the call director 111, the call director 111 returns the number to the campaign manager 112.

Based upon the received number of calls to generate, the campaign manager 112 obtains a corresponding number of contact records that will be used for contacting customers 104. To obtain the contact records, the campaign manager 112 communicates the number of calls to generate to a campaign list manager 113. The campaign list manager 113 then accesses a contact center database 114, which stores contact records, and determines which contact records to retrieve and to return to the campaign manager 112. Once a set of contact records has been selected, the campaign list manager 113 communicates the contact records to the campaign manager 112.

When the campaign manager 112 receives the contact records, it attempts to establish communication with the customers 104 that are associated with the contact records. If, for example, the contact records include telephone numbers, the campaign manager 112 may use an embedded dialer 112 and the telephone server's 102 outbound capabilities to dial the telephone numbers. Once a call is dialed, the telephone server 102 then waits for a response.

When a call is not answered by a customer 104 within a predetermined time, or when a machine answers the call, the call may be terminated. On the other hand, when a call is answered by a customer 104, the telephone server 102 receives a corresponding event and informs an automated call distributor 110 to distribute the call to an available agent 106 with the appropriate skills for handling the call. In order to determine agent availability, the automated call distributor 110 communicates with a user control 115, which keeps track of agent availability via the Internet 105 connection with the agents 106. If the user control 115 indicates that an appropriate agent 106 is available to handle the call, the call is distributed to that agent 106. However, if no appropriate agent 106 is available, the automated call distributor 110 queues the call and waits for an agent 106 to become available. During the wait, either the customer 104 or the system may abandon the call. However, if the call is not abandoned and an agent 106 becomes available, then the automated call distributor 110 distributes the call to the agent 106. Once a call is distributed to an agent 106, a communication connection is established between the customer 104 and the agent 106.

Whether a generated call helps keep agents 106 busy or adds to the backlog of queued calls depends on the level of agent occupancy at the time when the call reaches the automated call distributor 110. If agents 106 are available at that time, then the call will occupy at least one agent 106; on the other hand, if no agents 106 are available, then the call will add to the backlog. Therefore, when determining a number of calls to generate, it is desirable to consider the likely agent occupancy at the future time period when a generated call would likely reach the automated call distributor 110. If agent occupancy is likely to be low, then more calls should be generated to keep agents 106 utilized; if agent occupancy is likely to be high, fewer calls should be generated to lessen the likelihood of call abandonment. This is the basic principal behind a predictive dialing method that a dialing call calculator 116 may implement to determine a number of calls to generate.

In order to estimate a future agent occupancy, the dialing calculator 116 analyzes the status of each call that is currently in the system and determines its likelihood of occupying an agent at the future time period. The different statuses of a call will be described below with respect to FIG. 2, and how the statuses factor into the estimation of future agent occupancy will be described more fully below with respect to FIG. 3.

The description thus far describes the application server 101 handling a single campaign. The application server 101, however, may also be implemented to handle multiple outbound campaigns that have different sets of requirements (e.g., the outbound campaigns could have different target abandonment rates, target agent occupancies, required agent skill sets, target customers, etc.). In such a multiple outbound campaign environment, the application server 101 may employ multiple campaign managers 112 and multiple campaign list managers to manage the multiple outbound campaigns and the associated contact records.

In addition to outbound calls, the application server 101 may also process inbound calls. When a customer 104 calls the contact center, the call travels through the PSTN 103 and reaches the telephone server 102. The telephone server 102 transfers the call to an Interactive Voice Response system (IVR) 109, where a determination is made as to whether the customer 104 is to speak with an agent 106. If the customer 104 is to speak with an agent, the IVR 109 routes the inbound call to the automated call distributor 110, where the call would be distributed to an available agent with the appropriate skills for handling the call.

It should be understood that the system blocks or components described herein may be programs that are implemented by software instructions executing on one or more processing devices. In addition, the software blocks may each be implemented in a single, integrated software application, or in separate software applications.

Figure 2:
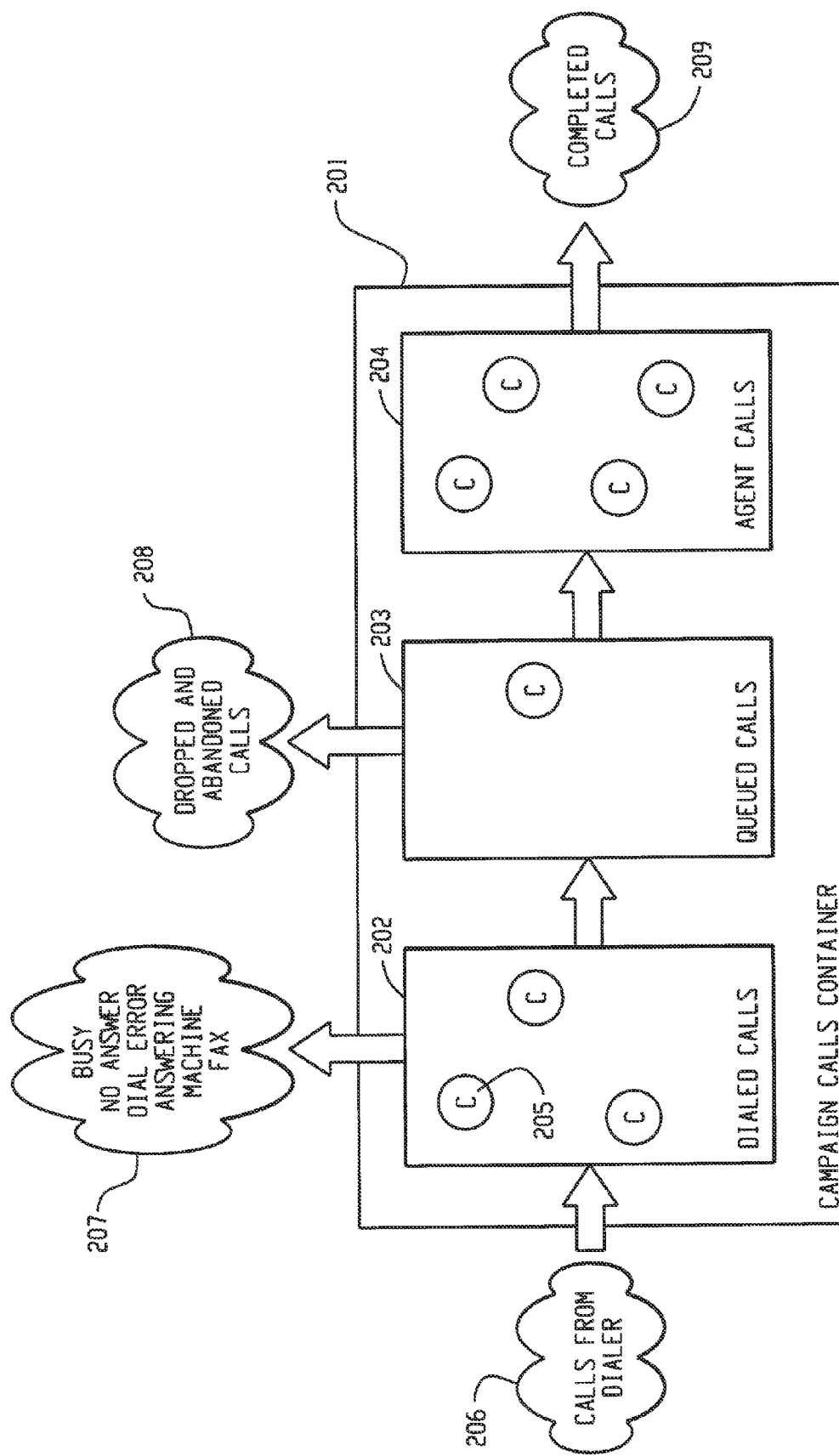
FIG. 2 is a block diagram of an example showing the different statuses of a call.

FIG. 2 illustrates the lifecycle and statuses of outbound calls in the application server 101. When a call is dialed by the dialer 112, a dialing event 206 causes a call software object 205 representing the dialed call to be generated and stored in a call container 201. While the dialed call is waiting for a response, it is considered as having a status of being dialed 202 and may be referred to as "being in the dialer." A number of results may cause termination 207 of the call at this time: the called number may be busy, the call may not be answered within a predefined time interval, the call may be answered by an answering machine or a fax machine, or a dialing error may have occurred. However, if the call is answered by a live person, the dialing is considered a success and the call's software object 205 would persist in the call container 201. The metric typically used for successful calls is called a hit ratio, which is defined as a fraction of successful calls to all generated calls.

A call that successfully connects to a customer then waits to be connected to an available agent. While waiting, the call is considered as having a status of being queued 203 and may be referred to as "being in the queue." If at the time the call enters the queue 203 there is an appropriate agent available to the call, the call is immediately connected to the agent (i.e., the call spends zero time in the queue). However, if no appropriate agent is immediately available, the call is queued until an appropriate agent becomes available to it. While the call is being queued, the customer, not wanting to wait any longer, may disconnect the call. The system itself may also drop the connection to satisfy regulations relating to call waiting time. In either case the call is considered to be abandoned 208. The metric for measuring abandoned calls is called abandonment rate, which is defined as a percentage of abandoned calls to all successful calls that entered the queue.

When a call is connected to an agent, a conversation between the agent and the customer may ensue and last for a period of time, which is usually a stochastic value. During the conversation, the agent is considered as being occupied and therefore unavailable to handle other calls. Moreover, even when the conversation terminates, the agent may continue to be occupied for a period of time to process wrap-up work. After the agent completes any wrap-up work, the agent may then be considered unoccupied and thus available to handle new calls. From the time an agent becomes occupied by a call to the time the agent becomes unoccupied, the call is considered as having a status of being handled 204 and may be referred to as "being in the agent pool." The duration of a call being in the agent pool may be referred to as agent handling time. It is when the agent becomes unoccupied after handling the call that the call is considered to be terminated or completed 209, at which time the call exists the system.

With the introduction of the concept of abandonment rate, objectives of the automatic dialing system may be described as optimizing agent occupancy and minimizing abandonment rate. These are contradictory goals, however, because when agents work close to the maximum occupancy (i.e., near 100%), waiting time for new calls may increase, which in turn may cause more calls to become abandoned. On the other hand, if a low volume of calls are generated to reduce abandonment rate, the number of calls may not keep the agents sufficiently occupied. Therefore, in practice a more practical objective is to generate an optimal number of outbound calls that would maintain agent occupancy within some predefined boundaries (e.g., between 80% and 95%) while keeping the abandonment rate less than some predefined value (e.g., less than 3%). The dialing methods described below are designed to help the automatic dialing system achieve this practical objective.

Figure 3:
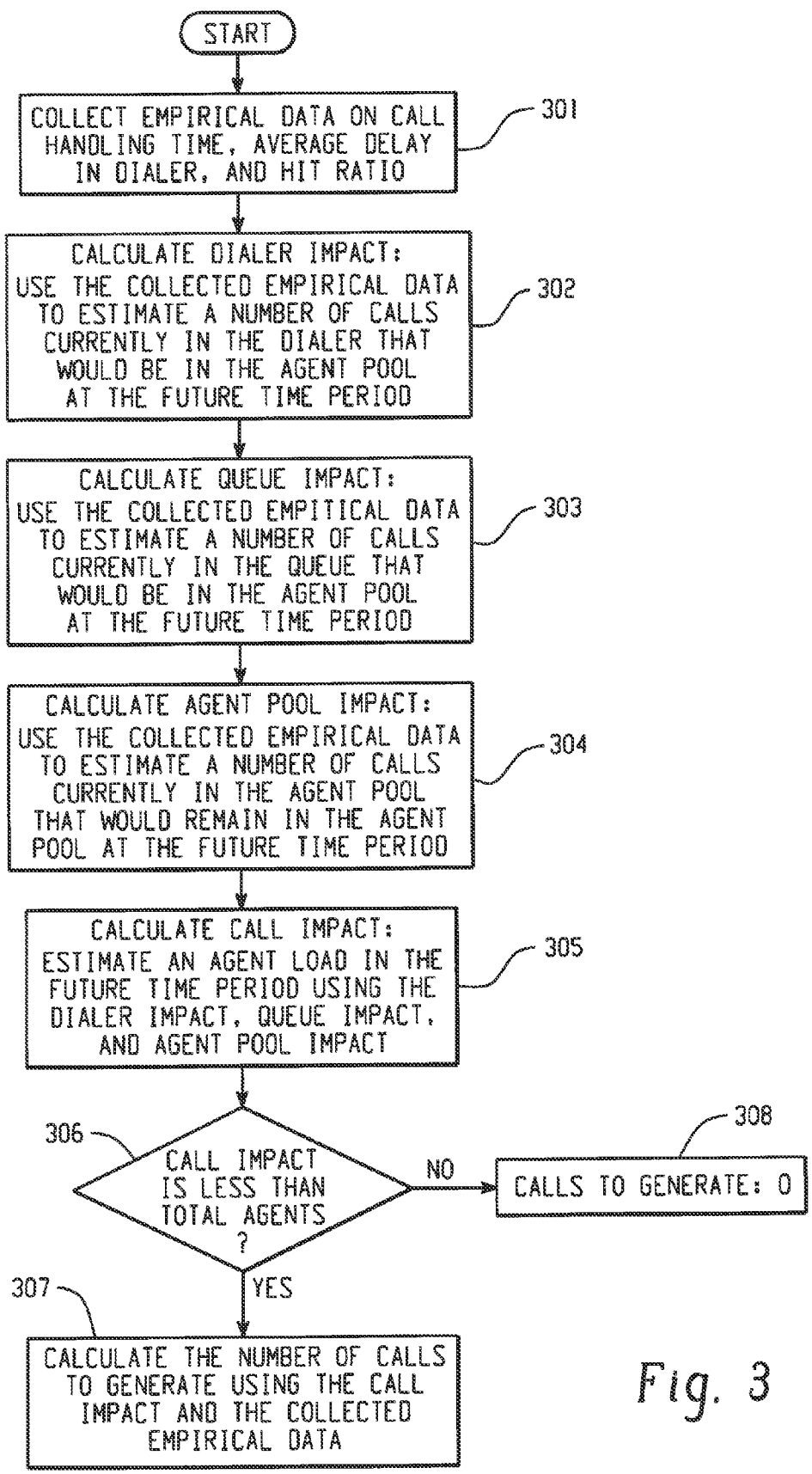
FIG. 3 is a flow diagram of an example predictive dialing method.

FIG. 3 is a flow diagram of an example predictive dialing method, which determines an optimal number of outbound calls to generate based upon an estimation of future agent occupancy. The predictive dialing method can be implemented by, for example, the dialing call calculator 116. As apparent from the above description with respect to FIG. 2, every call in the system has the potential of occupying an agent at a future time: calls in the dialer and the queue may enter the agent pool, and calls in the agent pool may remain in the agent pool. Thus, to estimate future agent occupancy, the predictive dialing method estimates the likely impact that each call currently in the dialer, queue, and agent pool will have on agent occupancy at the future time period. These impacts, respectively, will be termed dialer impact, denoted by $N_D$, queue impact, denoted by $N_Q$, and agent pool impact, denoted by $N_A$. Collectively, they will be termed call impact, which can be denoted and represented by the equation: $N=N_D+N_Q+N_A$.

The future time period of interest is the estimated moment when a currently generated call enters the agent pool. This is the time period of interest because agent occupancy at that time period will determine whether agents are available to handle the currently generated call. Therefore, if $t_0$ denotes the current time when the predictive dialing method is invoked and D denotes the average time for a generated call to enter the agent pool, the future time of interest can be denoted by $t=t_0+D$. Using this definition, the predictive dialing method's predictive objective can be characterized as predicting agent occupancy at time $t=t_0+D$, based upon all calls that are in the system at time $t_0$.

At 301 of FIG. 3's flow diagram, the predictive dialing method determines system data that will be used for estimating call impacts. This includes the average time D for a call to reach the agent pool, hit ratio h, and agent handling times. The data may be predetermined or dynamically generated based upon empirical data collected from the system or other systems.

At 302, 303, and 304, the predictive dialing method calculates the likelihood of each call in the system (i.e., each call in the dialer, the queue, and the agent pool) at time $t_0$ occupying an agent at time t. Although the example method depicted by FIG. 3 calculates the impacts in the order of dialer impact 302, queue impact 303, and agent pool impact 304, the impacts may be calculated in any order, including being calculated concurrently or in parallel. Furthermore, when calculating the dialer impact 302, queue impact 303, and agent pool impact 304, the impact contribution of each call in the system may also be calculated in any order, including being calculated concurrently or in parallel with each other.

At 302, the dialer impact is determined based upon the probability of each call in the dialer at time $t_0$ occupying an agent at time $t=t_0+D$. Let $C_D$ denote all calls in the dialer at time $t_0$, let $c_j \in C_D$ denote a call in the dialer, and let $\sigma_j \leq t_0$ denote the moment at which call $c_j$ entered the dialer. The duration that call $c_j$ has spent in the dialer by time $t_0$ can be expressed as $t_0-\sigma_j$. Since the average duration for a call to reach an agent is D and call $c_j$ has already spent $t_0-\sigma_j$ time units in the dialer, call $c_j$ is expected to reach the agent pool after $D-(t_0-\sigma_j)$ time units, or at time $t_0+D-(t_0-\sigma_j)$. Thus, in order for to remain in the agent pool at the future time $t=t_0+D$, $c_j$ would need to stay in the agent pool for an additional duration of at least $t-(t_0+D-(t_0-\sigma_j))=(t_0+D)-(t_0+D-(t_0-\sigma_j))=t_0-\sigma_j$. The probability of call $c_j$ being in the agent pool at time t can be estimated by the probability of a call in the agent pool taking more than $t_0-\sigma_j$ time units to complete, and can be expressed as: $P_j^D=1-F_A(t_0-\sigma_j)$, where $P_j^D$ denotes the probability of call $c_j$ remaining in the agent pool (i.e., not completing at time t) and $F_A(x)$ is the probability distribution function of agent handling time. However, in cases where call $c_j$ has been in the dialer for more than D time units (i.e., $t_0-\sigma_j>D$), the call is considered as entering the agent pool at time $t_0$. As such, the probability of call $c_j$ remaining in the agent pool at time t can be estimated by the probability of a call in the agent pool taking more than $t-t_0=D$ time units to complete, and can be expressed as: $P_j^D=1-F_A(D)$. Therefore, the probability of $c_j$ being in the agent pool at time t can be represented by the following equation:

$$P_j^D = \begin{cases} 1 - F_A(t_0 - \sigma_j), & \text{if } t_0 - \sigma_j \le D \\ 1 - F_A(D), & \text{otherwise} \end{cases} \quad (1)$$

Calculating $P_j^D$ for each call in the dialer at time $t_0$ and summing the results yields the dialer impact. However, since only some of the calls in the dialer will successfully connect to customers, the dialer impact is adjusted by the hit ratio. Thus, the dialer impact can be computed using the following equation:

$$N_D = h \cdot \sum_{c_j \in C_D(t_0)} P_j^D \quad (2)$$

At 303, the method calculates the queue impact $N_Q$. Calls in the queue are considered to be entering the agent pool at time $t_0$. Thus, if a call is to remain in the agent pool by time t, the call would have to stay in the agent pool for at least $t-t_0=D$ time units. As such, the probability of a call in the queue at time $t_0$ being in the agent pool at time t can be estimated by the probability of a call in the agent pool taking more than D time units to complete, which is expressed as: $1-F_A(D)$. Applying the $1-F_A(D)$ probability calculation to each call in the queue at time $t_0$ and aggregating the results yields the queue impact $N_Q$. Thus, the queue impact can be computed using the following equation:

$$N_Q = |Qc| \cdot (1 - F_A(D)) \quad (3)$$

where |Qc| represents the number of calls in the queue at time $t_0$.

At 304, the method calculates the agent pool impact $N_A$. The calculation of agent pool impact $N_A$ includes calculating the probability of a call in the agent pool at time $t_0$ remaining in the agent pool at time t, while taking into consideration that the call has already been in the agent pool for some duration. To express the calculation in mathematical notation, let $C_A$ denote all calls in the agent pool at time $t_0$, let $c_i \in C_A$ denote a call in the agent pool, and let $\tau_i \le t_0$ denote the moment at which call $c_i$ entered the agent pool. The duration that call $c_i$ has already spent in the agent pool by time $t_0$ can be expressed as $t_0-\tau_i$. Thus, if call $c_i$ is to remain in the agent pool at time t, which is D time units later from the current time $t_0$, then the total duration that call $c_j$ would have spent in the agent pool at time t can be expressed as $t_0-\tau_i+D$.

With the above definitions, the probability of a call in the agent pool at time $t_0$ remaining in the agent pool at time t can be estimated by the probability of a call not completing within $t_0-\tau_i+D$ duration, given that the call has not completed in $t_0-\tau_i$ duration. This probability can be expressed in standard conditional probability notation, $P(A|B)=P(A \cap B)/P(B)$, as: P (call not completing within $t_0-\tau_i+D$ duration call has not completed within $t_0-\tau_i$ duration). Given the definition of event A (i.e., call not completing within $t_0-\tau_i+D$ duration) and event B (i.e., call has not completed within $t_0-\tau_i$ duration), the union of $A \cap B$ can be simplified to be event A. This is because calls that are not completed within $t_0-\tau_i+D$ duration (i.e., event A) necessarily are not completed within the shorter $t_0-\tau_i$ duration (i.e., event B). Thus, the conditional probability of a call being in the agent pool at time t can be simplified as: $P(A|B)=P(A)/P(B)$.

Probability calculations again uses the probability distribution function of agent handling time, $F_A(x)$. Since $F_A(t_0-\tau_i+D)$ is the probability of a call completing within $t_0-\tau_i+D$ duration, the probability of a call not completing within $t_0-\tau_i+D$ duration (i.e., P(A)) can be expressed as $1-F_A(t_0-\tau_i+D)$. Similarly, P(B) can be expressed as $1-F_A(t_0-\tau_i)$. Thus, the probability of a call $c_i$ not completing at time t can be calculated using the following formula:

$$P_i^A = P(A|B) = \frac{P(A)}{P(B)} = \frac{1 - F_A(t_0 - \tau_i + D)}{1 - F_A(t_0 - \tau_i)} \quad (4)$$

Aggregating the $P_i^A$ value of each call in the agent pool at time $t_0$ yields the following equation for the agent pool impact:

$$N_A = \sum_{c_i \in C_A(t_0)} P_i^A \quad (5)$$

Having determined the dialer impact $N_D$, queue impact $N_Q$, and agent pool impact $N_A$, the predictive dialing method at 305 determines the total call impact N. As described above, call impact N represents an estimated total number of calls that would be in the agent pool at time t, and is defined as:

$$N = N_D + N_Q + N_A \quad (6)$$

At 306, the call impact N is compared to the total number of agents in the agent pool, denoted by m, to determine whether at time t there would likely be any unoccupied agents. If N is equal to or greater than m, that means that at time t the agents are likely to be at full capacity handling calls and would not have capacity to handle additional calls. Thus, the predictive dialing method at 308 returns $n_{predictive}=0$ to indicate that no new calls should be generated. On the other hand, if N is less than m, then it indicates that at time t it is likely that some agents would be available to handle calls. In particular, the estimated number of unoccupied agents at time t is m−N. However, more than m−N calls may be generated, since a portion of the generated calls would fail to connect to customers. Thus, taking hit ratio h into consideration, the predictive dialing method at 307 may return an estimated number of calls to generated based upon the equation:

$$n_{predictive} = \left\lfloor \frac{m - N}{h} \right\rfloor \quad (7)$$

Combining the two scenarios indicated by 307 and 308, the optimal number of calls to generate can be expressed as:

$$n_{predictive} = \begin{cases} \left\lfloor \frac{m-N}{h} \right\rfloor, & \text{if } m > N \\ 0, & \text{otherwise} \end{cases} \quad (8)$$

A predictive dialing method using equation 8 would likely maintain an average agent occupancy of 100%. Alternatively, to maintain an average agent occupancy of $u_{mean}$, equation 8 can be rewritten as:

$$n_{predictive} = \begin{cases} \left\lfloor \dfrac{u_{mean} \cdot m - N}{h} \right\rfloor, & \text{if } u_{mean} \cdot m > N \\ 0, & \text{otherwise} \end{cases} \quad (9)$$

The above equation for determining the optimal number of calls to generate may be modified to account for fluctuations in abandonment rate. For example, a clear indication that a system's abandonment rate should be reduced is when the current system abandonment rate R has reached or exceeded a predetermined allowable maximum abandonment rate, denoted by MAR. To actively reduce the abandonment rate, rather than using the predictive dialing method described above, a progressive dialing method may be used. The progressive dialing method is appropriate because it assumes the worst-case scenario, which is that each call in the system at time $t_0$ will be in the agent pool at time t. In other words, the method does not take into consideration that calls in the system at time $t_0$ may terminate or exit the system before the future time t. Thus, under the progressive dialing method the call impact is represented by the equation $N_0$=|Dc|+|Qc|+|Ac|, where $N_0$ denotes the call impact, and |Dc|, |Qc|, and |Ac| denote the number of calls in the dialer, the queue, and the agent pool, respectively, at time $t_0$. Alternatively, the equation for $N_0$ could also include the a ratio h to account for dialer calls that fail to reach customers, thus making the equation: $N_0$=h·|Dc|+|Qc|+|Ac|.

Once the call impact $N_0$ is determined, it is compared to m, the total number of agents in the agent pool, to determine the number of calls to generate. Thus, the equation for determining the number of calls to generate under the progressive dialing method can be expressed as:

$$n_{progressive} = \begin{cases} \left\lfloor \dfrac{m - N_0}{h} \right\rfloor, & \text{if } m > N_0 \\ 0, & \text{otherwise} \end{cases} \quad (10)$$

As indicated above, the progressive dialing method may be used when R≥MAR; but when R<MAR, the predictive dialing method described above is used. If a more aggressive approach to reducing abandonment rate is desirable, the number of calls calculated by the predictive dialing method (i.e., $n_{predictive}$) may be reduced based upon the abandonment rate R. An example of a corrected predictive dialing equation may be expressed as follows:

$$n_{corrected} = \begin{cases} n_{predictive} - \dfrac{n_{predictive} - n_{progressive}}{MAR} \cdot R, & \text{if } R < MAR \\ n_{progressive}, & \text{otherwise} \end{cases} \quad (11)$$

According equation 11, when the current abandonment rate R is zero, the predictive dialing method (i.e., $n_{predictive}$) will determine the number of calls to generate. If, however, the current abandonment rate R is more than zero but less than MAR, $n_{predictive}$ is reduced based upon the current abandonment rate R. Finally, if the current abandonment rate R is equal to or greater than MAR, then the number of calls to generate will be determined by the progressive dialing method (i.e., $n_{progressive}$).

Whichever dialing method is used, the outcome is returned to the campaign manager 112, and a corresponding number of calls is generated.

When calculating the dialer impact, the above described example of a predictive dialing method assumes that a call stays in the dialer for a deterministic time. However, because events that causes calls to exist the dialer (e.g., customers answering calls) are random, dialing time in practice is a stochastic value. Therefore, to account for the stochastic nature of dialing time, an alternative method for calculating dialer impact may be used.

Figure 4:
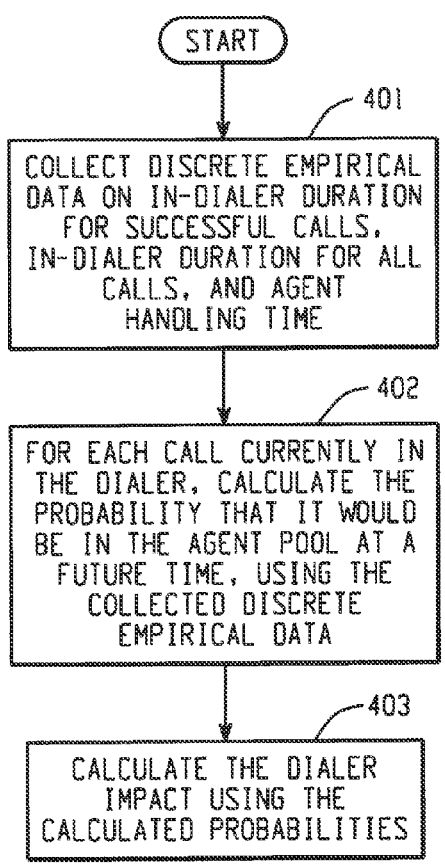
FIG. 4 is a flow diagram of an example method for determining dialer impact.

FIG. 4 is a flow diagram of an example method for calculating dialer impact while accounting for the stochastic nature of dialing time. For practicality and ease of implementation, the method uses discrete empirical data. At 401, discrete empirical data is collected on in-dialer duration of successful calls, in-dialer duration of all calls, and agent handling time. The data is used to construct probability distribution and density functions, which may be represented and stored as arrays of length N. For example, $P_S$=[$ps_1$, $ps_2$, . . . , $ps_N$] represents a probability density function of in-dialer time for successful calls; $F_D$=[$fd_1$, $fd_2$, . . . , $fd_N$] represents a probability distribution function of in-dialer time for all calls; and $F_A$=[$fa_1$, $fa_2$, . . . , $fa_N$] represents a probability distribution function of agent handling time. This procedure may be repeated periodically to ensure relevance of the data.

When the predictive dialing method is invoked, block 402 calculates the individual impact that each call in the dialer at time $t_0$ may have on the agent pool. The calculations may be made using the following or equivalent equation:

$$p = \sum_{i=B}^{E+1} \frac{ps_i}{1 - fd_i} \cdot (1 - fa_{E-i}) \quad (12)$$

where B≥0 is an integer corresponding to $t_0$, and E corresponds to t.

Once the individual impacts of each call is calculated, the method, at 403, calculates the dialer impact $N_D$ by summing the individual impacts. The dialer impact $N_D$ is then used by the predictive dialing method (e.g., equations 6 and 9) to calculate the number of calls to generate.

As indicated above, a predictive dialing method that uses equation 9 is in effect maintaining the system's average agent occupancy to be at a predetermined value $u_{mean}$. Due to the direct relationship between agent occupancy and abandonment rate, maintaining the average agent occupancy at a certain level means that the abandonment rate is also roughly maintained at an associated level. Therefore, in a contact center where a maximum abandonment rate is specified, it may be desirable to determine an optimal value for $u_{mean}$ such that the abandonment rate associated with the $u_{mean}$ value does not exceed the maximum abandonment rate.

Figure 5:
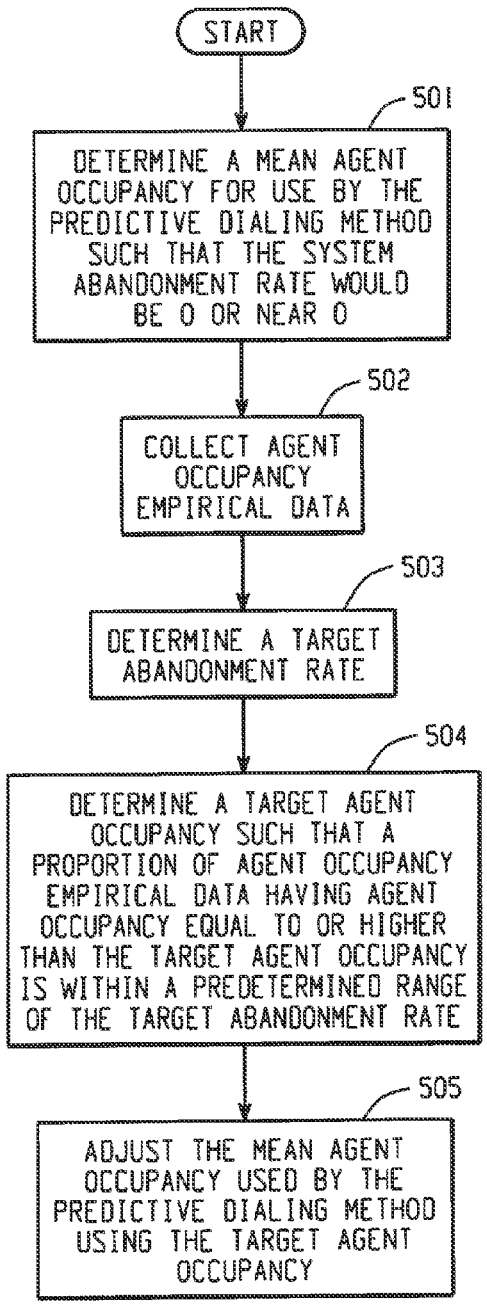
FIG. 5 is a flow diagram of an example method for determining a mean occupancy associated with a target abandonment rate.
Figure 6:
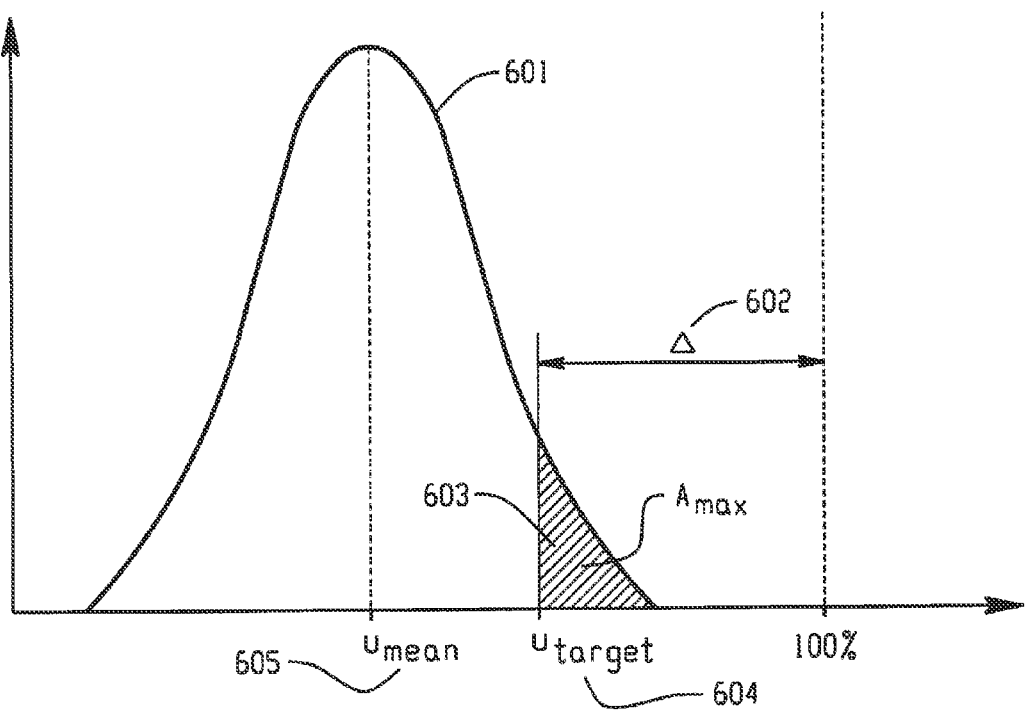
FIG. 6 is a graphical illustration of an example of how a mean occupancy's adjustment value is determined.

FIG. 5 is a flow diagram of an example of a method for determining an optimal average occupancy while keeping abandonment rate within a predetermined boundary. The first stage of the method involves collecting agent occupancy data while the system is in a "safe mode" where abandonment rate is zero or close to zero. At 501, the method sets the system in a "safe mode" regime by setting the mean occupancy $u_{mean}$ of the predictive dialing method to: $T_{AHT}/(T_{AHT}+T_D)$, where $T_{AHT}$ is an average agent handling time and $T_D$ is an average dialing time (both of which may be derived from empirical data). While the system is operating in "safe mode," empirical data is collect at 502 on agent occupancy and the data is used to generate a discrete density function of agent occupancy. An example of the agent occupancy density function is illustrated in FIG. 6 as curve 601.

In the next stage, the objective is to determine an adjustment value, denoted by Δ, for the mean agent occupancy $u_{mean}$ while keeping abandonment rate within a target maximum abandonment rate. At 503, the method determines the target maximum abandonment rate, denoted by $A_{max}$. The target abandonment rate $A_{max}$ is then used at 504 to determine a target agent occupancy, denoted by $u_{target}$, such that a proportion of agent occupancy empirical data having agent occupancy equal to or greater than the $u_{target}$ is equal to or within a predetermined range of $A_{max}$. As illustrated in FIG. 6, determining $u_{target}$ (604) is equivalent to finding an agent occupancy 604 where the area 603 under the curve 601 that is to the right of the agent occupancy 604 is equal or negligibly close to the target abandonment rate $A_{max}$.

With reference again to the flow diagram of FIG. 5, once $u_{target}$ is determined, the method at 505 calculates the adjustment value Δ, which is the difference between 100% occupancy and $u_{target}$ (i.e., $\Delta = 100\% - u_{target}$). In FIG. 6, Δ is represented by label 602.

Figure 7:
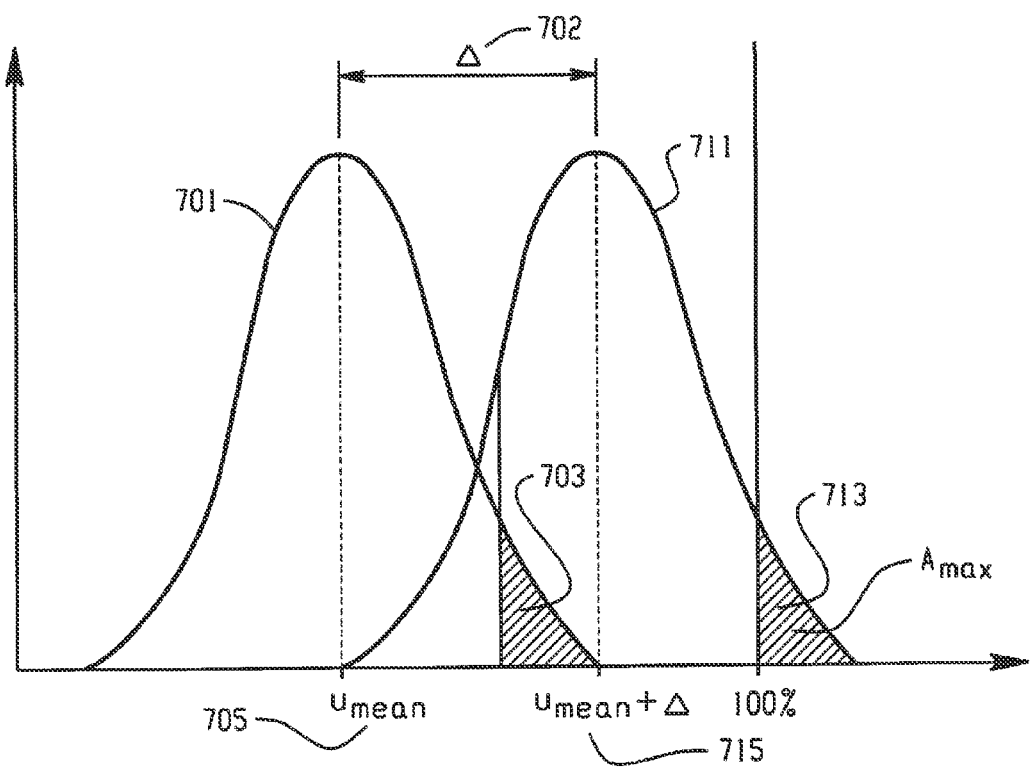
FIG. 7 is a graphical illustration of an example of an effect of adjusting a mean occupancy by an adjustment value.

At 505, the adjustment value Δ is used to adjust the original mean agent occupancy used by the predictive dialing method. In particular, the adjusted mean occupancy, $u_{mean'}$, may be calculated by using the following formula: $u_{mean'} = u_{mean} + \Delta$. FIG. 7 illustrates the effect of the adjustment. Changing the predictive dialing method's mean occupancy from $u_{mean}$ (705) to $u_{mean} + \Delta$ (715) effectively shifts the agent occupancy density function curve of the predictive dialing method from the left curve 701, which is associated with $u_{mean}$ (705), to the right curve 711, which is associated with $u_{mean} + \Delta$ (715), by a distance of Δ (702). Consequently, the left area 703, which is associated with the left curve 701, is shifted outside of the 100% occupancy threshold to be in the right area 713, which is associated with the right curve 711. Since the right area 713 is above 100% occupancy, it represents a likely abandonment rate when the predictive dialing method uses $u_{mean} + \Delta$ as the mean agent occupancy. The likely abandonment rate is expected to be within the target abandonment rate $A_{max}$ because the right area 713 is expected to be the same size as that of the left area 703, and that the left area 703 was determined based upon the condition that it be within or near the target abandonment rate $A_{max}$. The result of the foregoing is that the average agent occupancy maintained by the predictive dialing method is optimized (i.e., from $u_{mean}$ to $u_{mean} + \Delta$) while keeping the abandonment rate within the target maximum value $A_{max}$.

The above example method for determining optimal agent occupancy implicitly assumes that calls arriving to busy agents are abandoned. In other words, the method assumes that calls are abandoned if they arrive at an agent pool with 100% occupancy. However, depending on the system, calls may stay in a queue for some time (e.g., 2 seconds) before being removed and thus impacting the abandonment rate. Therefore, the adjustment value for $u_{mean}$ may be higher than Δ because of the additional calls buffered by the queue. The additional calls that may be queued before being removed by the system can be represented by μT, where $\mu = 1/T_{AHT}$ is a rate of call handling and T is the maximum time that a call can stay in the queue before being removed by the system. Therefore, an alternative expression for the adjusted optimal agent occupancy $u'_{mean}$ may be expressed by the following:

$$u'_{mean} = u_{mean} + \Delta + \mu T \qquad (13)$$

A predictive dialing method using $u'_{mean}$ is expected to maintain the system's average agent occupancy at $u'_{mean}$ while keeping the abandonment rate within $A_{max}$. However, in practice unexpected events (e.g., an agent or a group of agents disconnecting from the system) may cause the abandonment rate to jump to an abnormal abandonment rate $A_0$ that significantly exceeds $A_{max}$.

Figure 8:
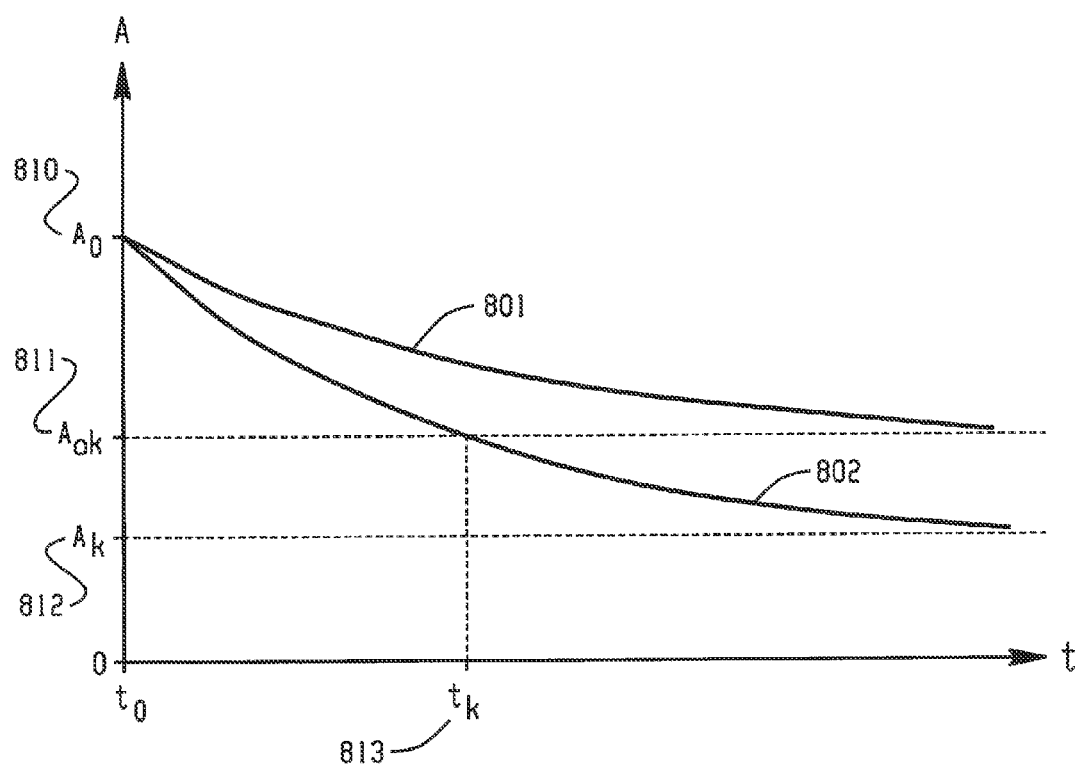
FIG. 8 is a graphical illustration of an example showing an effect of using an abandonment rate correction method.

FIG. 8 is a chart illustrating what may happen to the abandonment rate over time once it jumps to $A_0$(810). The top curve 801 represents the abandonment rate returning to its normal level $A_{ok}$ (811) over time if the predictive dialing method is not adjusted to correct the abnormal abandonment rate $A_0$(810). Although eventually the abandonment rate would return to normal levels, the time required may not be acceptable.

To have the abandonment rate return to normal within a shorter time, such as by time $t_k$(813), the mean occupancy used by the predictive dialing method may be set to a level that is less than its normal level. The effect of lowering the mean occupancy is that the system would have a corresponding lower expected abandonment rate, denoted by $A_k$(812), where $0 \leq A_k \leq A_{ok}$. The benefit of having a lower expected abandonment rate is that the system's abandonment rate would decrease at a faster rate to reach $A_k$, as illustrated by the bottom curve 802. In the process of reaching $A_k$, the bottom curve 802 may cross the normal abandonment rate $A_{ok}$ at time $t_k$. Once the abandonment rate returns to normal, the predictive dialing method's mean occupancy may set back to the normal level.

Figure 9:
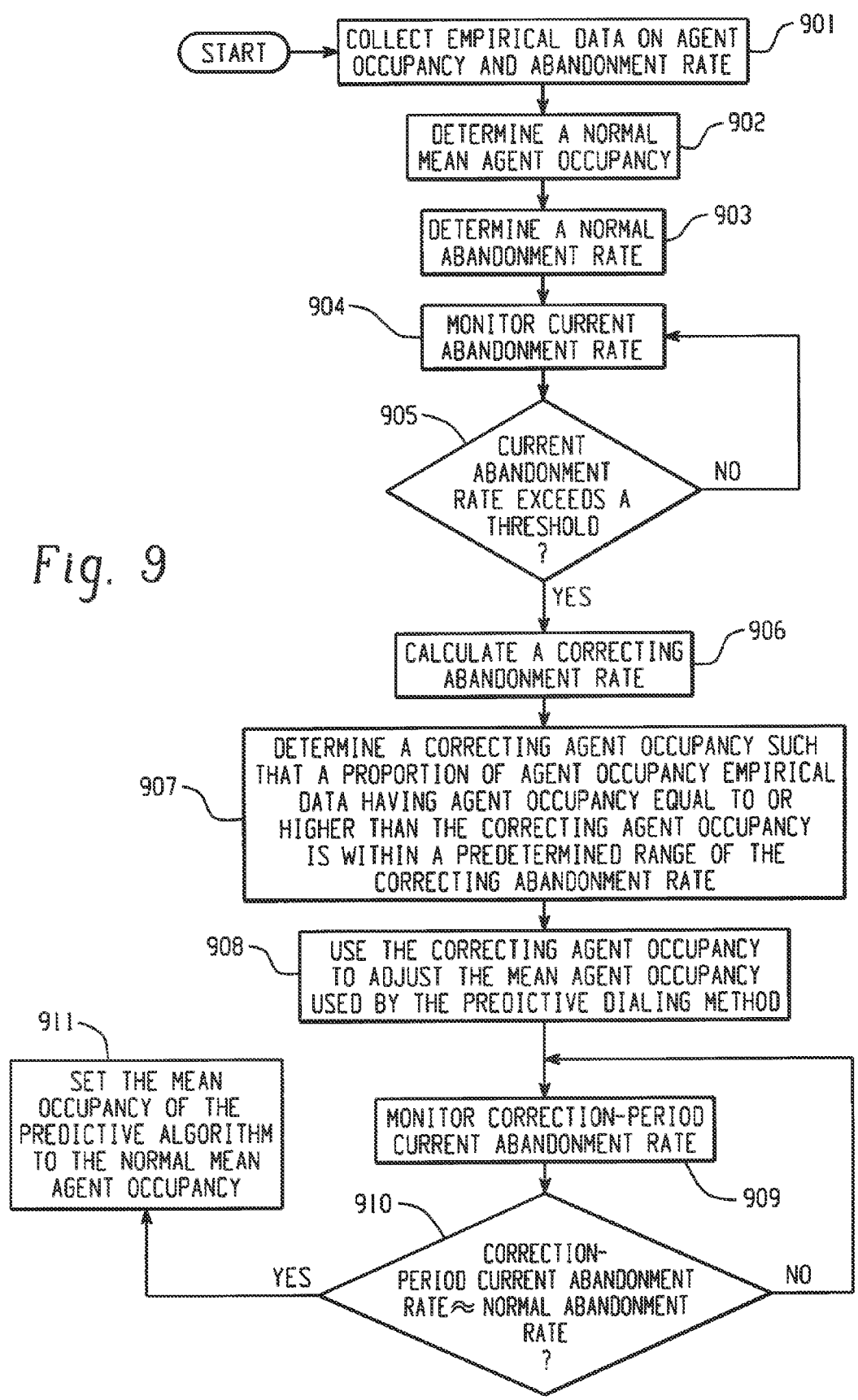
FIG. 9 is a flow diagram of an example method for correcting abandonment rate.

FIG. 9 is a flow diagram of an example method for correcting abandonment rate. At 901, the method collects empirical data on agent occupancy and abandonment rate during normal system operations. The collected empirical data is used to determine the normal mean occupancy u at 902 and the normal abandonment rate $A_{ok}$ at 903. At 904, the method monitors the current abandonment rate. At 905, if the current abandonment does not exceed a threshold, the method continues to monitor the current abandonment rate at 904. However, if at 905 the method determines that the current abandonment rate $A_0$ exceeds the threshold, then the method calculates a correcting abandonment rate $A_k$ at 906, using the following equation:

$$A_k = \frac{A_{ok} \cdot m \cdot \mu \cdot u \cdot t_k + A_{ok} N_0 - A_0 N_0}{m \cdot \mu \cdot u \cdot t_k} \qquad (14)$$

where $N_0$ is a number representing all calls generated before the current moment, m is the total number of agents, $\mu = 1/T_{AHT}$ is the system's average call handling rate, and $t_k$ is a desired duration for the abandonment rate to return to normal.

At 907, the correcting abandonment rate $A_k$ is used to determine an associated correcting mean occupancy $u_k$. This may be accomplished by using the method described above for calculating mean occupancy (i.e., the method described with respect to FIG. 5), using $A_k$ as the target abandonment rate. At 908, $u_k$ is set as the predictive dialing method's mean occupancy to begin the expedited process for correcting abandonment rate. During the correction process, the method at 909 continues to monitor the current abandonment rate. At 910, if the current abandonment rate remains outside a predetermined range of the normal abandonment rate $A_{ok}$, the method returns to 900 and continues to monitor the current abandonment rate. However, if the current abandonment rate is within the predetermined range of the normal abandonment rate $A_{ok}$, then the objective of correcting the abandonment rate is achieved. Having corrected the abandonment rate, at 911 the method switches the mean occupancy of the predictive dialing method back to the normal mean occupancy u, thereby returning the system to its normal regime.

The example predictive dialing method described so far is with respect to a single outbound campaign. Nevertheless, the method is scalable to handle blended (e.g., inbound and outbound campaigns) and multiple campaigns. These more complex operating environments, however, introduce additional challenges to the predictive dialing method. For example, in a blended and multi-campaign environment, agents may process inbound calls or other types of activities where arrival rate cannot be controlled, and agents may participate in more than one campaign. Furthermore, where several outbound campaigns compete for the same agents or resources, certain campaigns may have priority over others. For example, if two outbound campaigns are serviced by the same group of agents, a business requirement may specify that one outbound campaign is to have twice the agent workload or the number of generated calls as the other. A predictive dialing method in a blended and multi-campaign environment would need to take these additional considerations into account when determining the number of calls to generate.

Figure 10:
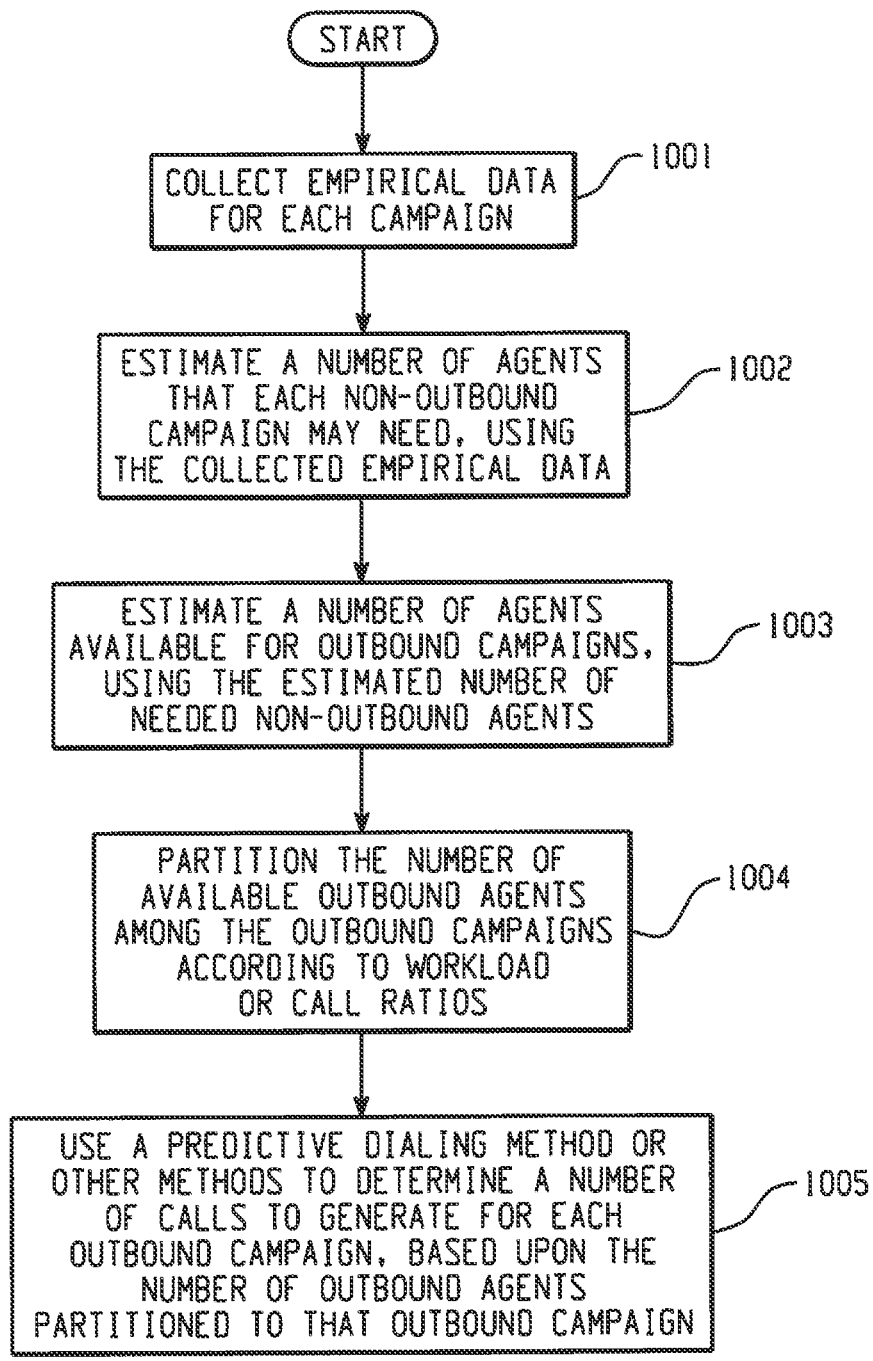
FIG. 10 is a flow diagram of an example method for applying a predictive dialing method in a multi-campaign and blended environment.

FIG. 10 is a flow diagram of an example method for determining the number of calls to generate for an outbound campaign in a blended and multi-campaign environment. At 1001, empirical data is collected on system operations for each campaign, such as agent handling time, hit ratio, average dialing time, and average answering time. This empirical data will be used in the calculations described below.

At 1002, the method estimates a number of agents that should be reserved for non-outbound activities, such as inbound calls and auto-dial calls. A distinction between non-outbound activities and outbound activities is that the flow of non-outbound activities is outside of the control of the virtual contact center, and that non-outbound activities typically take higher precedence than outbound activities.

Non-outbound activities are characterized by activity/call arrival rate, denoted by $\lambda$, and average agent handling time, denoted by $T_{AHT}$. The product $\lambda \cdot T_{AHT}$ is referred to as traffic offer, which characterizes non-outbound workload. Using these definitions, the estimated number of agents needed, denoted as $m^i_{in}$, to process activities/calls of an non-outbound campaign i can be expressed by the formula:

$$m^i_{in} = \frac{\lambda^i \cdot T^i_{AHT}}{u^i} \quad (15)$$

where $\lambda^i$, $T^i_{AHT}$, and $u^i$ are respectively the arrival rate, average agent handling time, and agent occupancy of the non-outbound campaign i. If the number of non-outbound campaigns handled by the system is denoted by I, the total number of estimated agents needed for processing all non-outbound activities can be expressed by:

$$\sum_{i=1}^{I} m^i_{in} = \sum_{i=1}^{I} \frac{\lambda^i \cdot T^i_{AHT}}{u^i} \quad (16)$$

Once the estimated number of agents needed for non-outbound campaigns is determined, the method, at 1003, determines an estimated number of agents available to outbound campaigns. The general idea is that any agent in excess of the number of agents needed for non-outbound campaigns is considered as being available to outbound campaigns, unless the agent is only able to handle non-outbound activities/calls. More specifically, let M denote the total number of agents and let $M^{in}$ denote the total number of agents that only handle inbound activities. The number of agents available to outbound campaigns, denoted as $M^{out}$, may be expressed as:

$$M^{out} = M - \max\left(\sum_{i=1}^{I} \frac{\lambda^i \cdot T^i_{AHT}}{u^i}, M^{in}\right) \quad (17)$$

At 1004, the estimated number of agents available to the outbound campaigns (i.e., $M^{out}$) is then partitioned among the outbound campaigns. The partitioning may be performed based upon a predetermined ratio, which may be defined in terms of agent workload or generated calls. If N denotes the number of outbound campaigns, let $R^w = \{r_1^w, r_2^w, \ldots, r_N^w\}$ denote a workload ratio, let $R^c = \{r_1^c, r_2^c, \ldots, r_N^c\}$ denote a generated call ratio, and let $T = \{T_1, T_2, \ldots, T_N\}$ denote average agent handling times, where $r_j^c$, $r_j^w$, and $T_j$ correspond to an outbound campaign j. Thus, the effective number of agents available to an outbound campaign j can be determined by the following formula if workload ratio is used:

$$m_j^w = M^{out} \cdot \frac{r_j^w}{\sum_{i=1}^{N} r_i^w}, \quad 0 < j \leq N \quad (18)$$

Similarly, the effective number of agents available to the outbound campaign j can be determined by the following formula if generated call ratio is used:

$$m_j^c = M^{out} \cdot \frac{T_j \cdot r_j^c}{\sum_{i=1}^{N} T_i \cdot r_i^c}, \quad 0 < j \leq N, \, r_j^c \neq 0 \quad (19)$$

At 1005, different methods may be invoked for different outbound campaigns to determine an optimal number of calls to generate for each outbound campaign. One such method is a modified version of the above described predictive dialing method. The modified method differs in that the statistical and empirical data used in the calculations are gathered from and specific to the outbound campaign j. Furthermore, instead of using the total number of agents in the system (i.e., m) to assess agent availability, the effective number of agents available to the outbound campaign j is used (i.e., $m_j^w$ or $m_j^c$). Also, when calculating call impact, the method may take into consideration only calls in the system that are associated with campaign j. For example, the calculation of campaign j's dialer impact $N_D^j$, queue impact $N_Q^j$, and agent pool impact $N_A^j$ may only take into consideration calls in the dialer, queue, and agent pool, respectively, that require an agent skill set handled by the campaign j. Incorporating these differences into equation 10 of the predictive dialing method yields the following formula for determining the number of calls to generate for the campaign j:

$$n^j_{predictive} = \begin{cases} \left\lfloor \frac{m_j^w \cdot u_{max} - N^j}{h} \right\rfloor, & \text{if } m_j^w \cdot u_{max} > N^j \\ 0, & \text{otherwise} \end{cases} \quad (20)$$

where $N^j=N_D^j+N_Q^j+N_A^j$, $u_{max}$ is the maximum agent occupancy for the campaign, and $m_j^w$ may be replaced by $m_j^c$.

It should be understood that similar to the other processing flows described herein, one or more of the steps and the order in the flowchart may be altered, deleted, modified and/or augmented and still achieve the desired outcome.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A method, performed by an automated dialing system, for determining a number of outbound calls to generate for a specific outbound campaign in a blended environment managed by an automated contact center, wherein the automated contact center processes a plurality of outbound campaigns and one or more non-outbound agent activities, the method comprising:
    collecting empirical data on the outbound campaigns and the one or more non-outbound agent activities;
    estimating an estimated number of non-outbound agents for each of the one or more non-outbound agent activities using the empirical data associated with that non-outbound agent activity;
    determining an effective number of agents available to the outbound campaigns using the estimated number of non-outbound agents for each of the one or more non-outbound agent activities;
    determining a number of outbound agents available to the specific outbound campaign by multiplying the effective number of agents by a ratio, the ratio representing an amount of a parameter for the specific outbound campaign divided by a total amount of the parameter for the plurality of the outbound campaigns, wherein the parameter is agent workload or generated calls; and
    determining the number of outbound calls to generate for the specific outbound campaign using the number of outbound agents available to the specific outbound campaign and the empirical data associated with the specific outbound campaign.

2. The method of claim 1, wherein the one or more non-outbound agent activities include one or more inbound campaigns.

3. The method of claim 1, wherein empirical data associated with non-outbound agent activity includes activity arrival rate and agent handling time.

4. The method of claim 1, wherein estimating an estimated number of non-outbound agents for each of the one or more non-outbound agent activities includes using an agent occupancy associated with that non-outbound agent activity.

5. The method of claim 1, wherein determining the number of outbound agents available to the specific outbound campaign includes partitioning the effective number of agents among the one or more outbound campaigns according to a ratio between a workload value associated with each of the outbound campaigns.

6. The method of claim 1, further comprising:
    determining a number of outbound agents available to a second outbound campaign using the effective number of agents;
    determining a number of outbound calls to generate for the second outbound campaign using the number of outbound agents available to the second outbound campaign and according to a second dialing method;
    wherein determining the number of outbound calls to generate for the specific outbound campaign is according to a dialing method that is different from the second dialing method.

7. The method of claim 1, wherein the parameter is agent workload.

8. The method of claim 1, wherein the parameter is generated calls.

9. An automated dialing system for determining a number of outbound calls to generate for a specific outbound campaign in a blended environment managed by an automated contact center, wherein the automated contact center processes a plurality of outbound campaigns and one or more non-outbound agent activities, the system comprising:
    one or more processors;
    a non-transitory computer-readable storage medium containing instructions configured to cause the one or more processors to perform operations, including:
        collecting empirical data on the outbound campaigns and the one or more non-outbound agent activities;
        estimating an estimated number of non-outbound agents for each of the one or more non-outbound agent activities using the empirical data associated with that non-outbound agent activity;

determining an effective number of agents available to the one or more outbound campaigns using the estimated number of non-outbound agents for each of the one or more non-outbound agent activities;

determining a number of outbound agents available to the specific outbound campaign by multiplying the effective number of agents by a ratio, the ratio representing an amount of a parameter for the specific outbound campaign divided by a total amount of the parameter for the plurality of the outbound campaigns, wherein the parameter is agent workload or generated calls; and determining the number of outbound calls to generate for the specific outbound campaign using the number of outbound agents available to the specific outbound campaign and the empirical data associated with the specific outbound campaign.

10. The system of claim 9, wherein the one or more non-outbound agent activities include one or more inbound campaigns.

11. The system of claim 9, wherein empirical data associated with non-outbound agent activity includes activity arrival rate and agent handling time.

12. The system of claim 9, wherein estimating an estimated number of non-outbound agents for each of the one or more non-outbound agent activities includes using an agent occupancy associated with that non-outbound agent activity.

13. The system of claim 9, wherein determining the number of outbound agents available to the specific outbound campaign includes partitioning the effective number of agents among the one or more outbound campaigns according to a ratio between a workload value associated with each of the outbound campaigns.

14. The system of claim 9, further comprising instructions to cause the one or more processors to perform operations, including:

determining a number of outbound agents available to a second outbound campaign using the effective number of agents;

determining a number of outbound calls to generate for the second outbound campaign using the number of outbound agents available to the second outbound campaign and according to a second dialing method;

wherein determining the number of outbound calls to generate for the specific outbound campaign is according to a dialing method that is different from the second dialing method.

15. An apparatus for determining a number of outbound calls to generate for a specific outbound campaign in a blended environment managed by an automated contact center, wherein the automated contact center processes a plurality of outbound campaigns and one or more non-outbound agent activities, the apparatus comprising:

means for collecting empirical data on the one or more outbound campaigns and the one or more non-outbound agent activities;

means for estimating an estimated number of non-outbound agents for each of the one or more non-outbound agent activities using the empirical data associated with that non-outbound agent activity;

means for determining an effective number of agents available to the one or more outbound campaigns using the estimated number of non-outbound agents for each of the one or more non-outbound agent activities;

means for determining a number of outbound agents available to the specific outbound campaign by multiplying the effective number of agents by a ratio, the ratio representing an amount of a parameter for the specific outbound campaign divided by a total amount of the parameter for the plurality of the outbound campaigns, wherein the parameter is agent workload or generated calls; and means for determining the number of outbound calls to generate for the specific outbound campaign using the number of outbound agents available to the specific outbound campaign and the empirical data associated with the specific outbound campaign.

16. The apparatus of claim 15, wherein the one or more non-outbound agent activities include one or more inbound campaigns.

17. The apparatus of claim 15, wherein empirical data associated with non-outbound agent activity includes activity arrival rate and agent handling time.

18. The apparatus of claim 15, wherein the means for estimating an estimated number of non-outbound agents for each of the one or more non-outbound agent activities includes using an agent occupancy associated with that non-outbound agent activity.

19. The apparatus of claim 15, wherein the means for determining the number of outbound agents available to the specific outbound campaign includes partitioning the effective number of agents among the one or more outbound campaigns according to a ratio between a workload value associated with each of the outbound campaigns.

20. The apparatus of claim 15, further comprising:

means for determining a number of outbound agents available to a second outbound campaign using the effective number of agents;

means for determining a number of outbound calls to generate for the second outbound campaign using the number of outbound agents available to the second outbound campaign and according to a second dialing method;

wherein the means for determining the number of outbound calls to generate for the specific outbound campaign is according to a dialing method that is different from the second dialing method.

* * * * *